US012768202B2

(12) United States Patent
Williams et al.

(10) Patent No.: US 12,768,202 B2
(45) Date of Patent: Oct. 20, 2026

(54) LOCK

(71) Applicant: SUPRA (UK) LIMITED, Worchestershire (GB)

(72) Inventors: Robert Williams, Worcestershire (GB); David Lee Ogden, Worcestershire (GB)

(73) Assignee: SUPRA (UK) LIMITED, Worchestershire (GB)

( * ) Notice: Subject to any disclaimer, the term of this patent is extended or adjusted under 35 U.S.C. 154(b) by 0 days.

(21) Appl. No.: 18/703,534

(22) PCT Filed: Oct. 19, 2022

(86) PCT No.: PCT/GB2022/052673
§ 371 (c)(1),
(2) Date: Apr. 22, 2024

(87) PCT Pub. No.: WO2023/067341
PCT Pub. Date: Apr. 27, 2023

(65) Prior Publication Data

US 2024/0418006 A1 Dec. 19, 2024

(30) Foreign Application Priority Data

Oct. 23, 2021 (GB) ..................................... 2115283

(51) Int. Cl.
*E05B 37/16* (2006.01)
*E05B 15/04* (2006.01)
(Continued)

(52) U.S. Cl.
CPC .......... *E05B 37/16* (2013.01); *E05B 37/0003* (2013.01); *E05B 2015/0496* (2013.01); *E05B 65/52* (2013.01)

(58) Field of Classification Search
CPC .... E05B 37/16; E05B 37/0003; E05B 37/166; E05B 37/001; E05B 37/00;
(Continued)

(56) References Cited

U.S. PATENT DOCUMENTS 3,910,078 A * 10/1975 Schulz .................... E05B 37/16 70/287
3,937,046 A * 2/1976 Wang ...................... E05B 37/16 70/315
(Continued)

FOREIGN PATENT DOCUMENTS

CN 107165508 A * 9/2017 ............. E05B 65/52
CN 112096185 A * 12/2020 ............. E05B 17/22
(Continued)

OTHER PUBLICATIONS

International Search Report and Written Opinion issued Nov. 22, 2022 in related International Application No. PCT/GB2022/052673 filed Oct. 19, 2022.
(Continued)

*Primary Examiner* — Steven A Tullia
(74) *Attorney, Agent, or Firm* — Dinsmore & Shohl LLP

(57) ABSTRACT

A lock (100) comprising a plurality of buttons (111), each button (111) having an axis along which each of the buttons (111) may be axially pressed between an un-pressed position and a pressed position, a locking plate (120), an actuator (114) configured to drive the locking plate (120): a locking mechanism (122) having an unlocked and a plurality of locked states, the plurality of locked states corresponding to different selections of buttons (111) having been pressed into their pressed positions; and a latch (117); in which, when the locking mechanism (122) is in the unlocked state, the locking plate (120) can be driven by the actuator (114) from
(Continued)

a locked position into an 10 unlocked position so as to disengage the latch (117) and unlocking the lock (100), but when the locking mechanism (122) is in one of the locked states, the locking mechanism (122) prevents the locking plate (120) being moved by the actuator (114): the lock (100) further comprising a decoupling mechanism (200) by means of which the actuator (114) can drive the locking plate (120), the decoupling mechanism (200) being arranged to decouple the actuator (114) from the locking plate (120), so as to reduce any feedback indicative of which of the unlocked states the locking mechanism (122) is in passing from the locking plate (120) to the actuator (114). In one example, the decoupling mechanism (200) comprises a driven member (201) driven for motion by the actuator (114), a first resilient member (202) connecting the driven member (201) with the locking plate (120) and a second resilient member (203) connecting the locking plate (120) to a fixed member fixed relative to a housing of the lock (100); and in which the first (202) and second (203) resilient members each have a spring constant, with the spring constant of the first resilient member (202) being greater than the spring constant of the second resilient member (203).

11 Claims, 11 Drawing Sheets

(51) Int. Cl.
*E05B 37/00* (2006.01)
*E05B 65/52* (2006.01)

(58) Field of Classification Search
CPC .. E05B 37/0048; E05B 37/0058; E05B 65/52; E05B 2015/0496; E05B 17/0058; E05B 17/0054; E05B 17/10; E05B 19/0005; E05B 13/103; E05B 13/004; Y10S 70/44; Y10T 70/7158; Y10T 70/415; Y10T 70/7311; Y10T 70/7147; Y10T 70/7141; Y10T 70/8351; Y10T 70/7164
USPC .... 70/299, 214, 313, 287, 21, 284, 288, 285
See application file for complete search history.

(56) References Cited

U.S. PATENT DOCUMENTS

| | | | | |
|---|---|---|---|---|
| 4,827,743 | A * | 5/1989 | Kim | E05B 37/16 70/315 |
| 6,145,355 | A * | 11/2000 | Burleigh | E05B 37/16 70/214 |
| 6,298,698 | B1 * | 10/2001 | Nakajima | E05B 37/16 70/299 |
| 7,043,948 | B1 * | 5/2006 | Wang | E05B 37/16 70/299 |
| 7,318,331 | B2 * | 1/2008 | Miao | E05B 37/16 70/315 |
| 8,215,141 | B2 | 7/2012 | Yi et al. | |
| 8,276,413 | B2 * | 10/2012 | Talpe | E05B 37/16 70/299 |
| 8,375,751 | B2 * | 2/2013 | Hacker | E05B 19/0005 70/299 |
| 9,347,241 | B1 * | 5/2016 | Peng | E05B 37/0048 |
| 9,790,710 | B2 * | 10/2017 | Talpe | E05B 3/00 |
| 9,828,790 | B2 * | 11/2017 | Hill | E05B 37/16 |
| 9,890,560 | B2 * | 2/2018 | Wong | E05B 37/16 |
| 2002/0088256 | A1 * | 7/2002 | Taylor | E05B 37/16 70/284 |
| 2004/0112099 | A1 * | 6/2004 | Randall | E05B 19/0005 70/63 |
| 2008/0115546 | A1 * | 5/2008 | Hu | E05B 13/004 70/214 |
| 2015/0101371 | A1 * | 4/2015 | Yi | E05B 37/16 70/382 |
| 2017/0321451 | A1 * | 11/2017 | Williams | E05B 37/0048 |
| 2020/0165480 | A1 | 5/2020 | Wong | |
| 2024/0418006 | A1 * | 12/2024 | Williams | E05B 37/16 |

FOREIGN PATENT DOCUMENTS

| | | | | | |
|---|---|---|---|---|---|
| CN | 112096186 | A * | 12/2020 | | E05B 37/0041 |
| CN | 213654498 | U * | 7/2021 | | E05B 13/004 |
| EP | 1813743 | A1 * | 8/2007 | | E05B 37/16 |
| EP | 2886755 | A1 * | 6/2015 | | E05B 65/0007 |
| EP | 3241960 | A1 * | 11/2017 | | E05B 19/0005 |
| GB | 2148379 | A * | 5/1985 | | E05B 37/16 |
| GB | 2176233 | A * | 12/1986 | | E05B 37/16 |
| GB | 2317200 | A * | 3/1998 | | E05B 37/16 |
| GB | 2343481 | A * | 5/2000 | | E05B 37/16 |
| GB | 2343482 | B * | 9/2000 | | E05B 37/16 |
| GB | 2403258 | A * | 12/2004 | | E05B 37/166 |
| GB | 2420585 | A * | 5/2006 | | E05B 37/16 |
| GB | 2420585 | B * | 10/2006 | | E05B 37/16 |
| GB | 2485852 | A * | 5/2012 | | E05B 13/103 |
| GB | 2485853 | A * | 5/2012 | | E05B 37/163 |
| GB | 2485852 | B * | 10/2016 | | E05B 37/00 |
| GB | 2554505 | A * | 4/2018 | | E05B 37/0048 |
| JP | S62291380 | A * | 12/1987 | | E05B 37/16 |
| JP | H0666055 | A | 3/1994 | | |
| JP | 3067096 | B2 * | 7/2000 | | E05B 63/0065 |
| JP | 3764864 | B2 * | 4/2006 | | E05B 37/16 |
| JP | 2009127342 | A * | 6/2009 | | E05B 37/16 |
| JP | 4812888 | B1 * | 11/2011 | | E05B 37/16 |
| KR | 890007772 | Y1 * | 10/1989 | | E05B 37/00 |
| WO | WO-8505399 | A1 * | 12/1985 | | E05B 37/16 |
| WO | WO-2011071868 | A1 * | 6/2011 | | E05B 37/00 |
| WO | 2017190891 | A1 | 11/2017 | | |

OTHER PUBLICATIONS

Letter and Search Report pertaining to UK Application No. GB2115283.0 dated Jun. 30, 2022.

* cited by examiner

LOCK

CROSS-REFERENCE TO RELATED APPLICATIONS

This application is a national-stage application under 35 U.S.C. § 371 of International Application No. PCT/GB2022/052673, filed Oct. 19, 2022, which International Application claims benefit of priority to United Kingdom Patent Application No. 2115283.0, filed Oct. 23, 2021.

The present invention relates to a lock, typically but not exclusively for use in a lockable enclosure.

A typical lock comprises a locking member, such as a lock bolt or latch, which is received within a keep when the lock is activated. When the lock is deactivated the locking member can be withdrawn from the keep. A lock mechanism is typically used to selectively restrict or control movement of a lock and/or control the locking member.

Lockable enclosures are used in many indoor or outdoor environments, both commercial and residential, to restrict access to various items by providing the enclosure with a lockable door, lid, drawer or other barrier. An example of such an enclosure is a key safe which is configured to securely house one or more keys and is affixed external to an entry door or building. The key safe comprises a locking mechanism, such as a pushbutton or combination dial locking mechanism, such that authorised users may enter the required unlocking combination or sequence and gain access to the one or more keys housed in the key safe. Additionally or alternatively, the lockable enclosure may house one or more credit and/or debit cards and/or money.

It is increasingly common for such key safes (or other locking enclosures) to comprise a mechanical pushbutton locking mechanism. Mechanical pushbutton locking mechanisms do not require an electrical power source to maintain accessibility to or function of the locking mechanism, thus there is no security risk posed by power outages or battery depletion.

Typically, a mechanical pushbutton lock comprises a series of buttons, each button configured to be disposed in either a depressed or selected position or an un-pressed or unselected position. When only the correct buttons have been pressed (irrelevant of the order in which the buttons are selected) the locking mechanism is configured to move a locking member from a locked position to an unlocked position. In practice, the security provided by these mechanisms may be inadequate, as the number of potential code combinations is limited because the codes are not sequence dependent. As such, the codes can be broken relatively quickly and easily by an unauthorised user simply by exhausting all of the possible code combinations.

A known solution to this problem is to use a mechanical pushbutton lock comprising a large number of buttons, thereby increasing the number of potential code combinations. This increases the security of the lock as it makes it more difficult for an unauthorised person to determine the correct code. However, in order to accommodate the additional buttons, the lock can be cumbersomely large. Also, if the code is too long it is easy for an authorised person to forget it, preventing them from opening the enclosure.

An alternative known solution is to use a mechanical pushbutton lock, wherein each button can be pressed multiple times (e.g. two or more times), sometimes known as a multi-press mechanical pushbutton lock. This increases the number of potential code combinations without increasing the number of buttons required on the locking mechanism.

An example of a multi-press mechanical pushbutton lock is disclosed in US 2011/0132049.

In certain circumstances, it may be possible to break (also known as pick) a mechanical pushbutton lock, both the standard and multi-press version, without systematically trying each possible code combination. For example, and in broad terms, a skilled lock-breaker can turn the lever or other actuator to open the enclosure and then press the buttons until he hears and/or feels the locking mechanism click into the unlocked position.

We have previously proposed a push-button lock which can be used in at least lockable enclosures in our previous patent application published as WO2017/190891. In the mechanisms described in that document, a user wishing to unlock the lock must press each button the correct number of times (from zero times up to four times for each button). Thus, that lock represents an increase in the security of push-button locks, as the number of possible combinations is increased over a lock where each button must either be pressed or not pressed.

According to a first aspect of the invention, we provide a lock comprising:

- a plurality of buttons, each button having an axis along which each of the buttons may be axially pressed between an un-pressed position and a pressed position,
- a locking plate,
- an actuator configured to drive the locking plate:
- a locking mechanism having an unlocked and a plurality of locked states, the plurality locked states corresponding to different selections of buttons having been pressed into their pressed positions; and
- a latch:
- in which, when the locking mechanism is in the unlocked state, the locking plate can be driven by the actuator from a locked position into an unlocked position so as to disengage the latch and unlocking the lock, but when the locking mechanism is in one of the locked states, the locking mechanism prevents the locking plate being moved by the actuator:
- the lock further comprising a decoupling mechanism by means of which the actuator can drive the locking plate, the decoupling mechanism being arranged to decouple the actuator from the locking plate, so as to reduce any feedback indicative of which of the unlocked states the locking mechanism is in passing from the locking plate to the actuator.

As such, the decoupling mechanism can prevent an operator of the lock receiving any feedback as to which locked state of the locking mechanism by trying to unlock the lock.

Typically, the decoupling mechanism may comprise a driven member driven for motion by the actuator, a first resilient member connecting the driven member with the locking plate and a second resilient member connecting the locking plate to a fixed member fixed relative to a housing of the lock. As such, the first and second resilient members may act to isolate or decouple the actuator from the locking plate.

The first and second resilient members may each have a spring constant, with the spring constant of the first resilient member being greater than the spring constant of the second resilient member. Thus, it is likely that, as the load on the first and second resilient members increases as an attempt is made to drive the locking plate, the load will initially be preferentially be taken up by the second resilient member, as that has the lower spring constant.

Typically, each of the first and second resilient members will comprise springs, typically helical springs (especially helical compression springs), although alternatively any elastically compressible or extendable member may be used.

The actuator may comprise a rotating member. The rotating member may have an eccentric cam which drives the driven member. The locking plate may comprise a blocking member which, in the locked position of the locking plate, limits rotation of the actuator to a limit, but in the unlocked position of the locking plate, allows the actuator to rotate past the limit.

Typically, the locking mechanism may comprise a sub-mechanism for each button, with the sub mechanism blocking movement of the locking plate unless the button has been pressed a pre-determined number of times. As such, by using the decoupling mechanism, if the locking mechanism is still in the locked state, the possibility that a user will be able to determine which of the buttons have been pressed the correct number of times in order to unlock the lock is reduced.

Each button may have an axis along which the button may be axially pressed between an un-pressed position and a pressed position. The lock may comprise a button biasing member associated with each of the plurality of buttons, configured to bias each button towards the un-pressed position. Each sub-mechanism may comprise a spool, each spool comprising a plurality of circumferential grooves, each circumferential groove having a notch extending over a portion of the circumferential groove, wherein each notch on a given spool is angularly displaced relative to each of the other notches on that spool, the circumferential grooves being parallel and separated spaced apart at a groove spacing from each other. Each sub-mechanism may comprise a plurality of legs, each leg in communication with one of the buttons, wherein each leg is arranged to contact one of the circumferential grooves of one of the spools. The locking plate may have a plurality of apertures, each aperture arranged to receive one of the spools therethrough. Pressing one of the buttons may cause the leg in communication with the button to translate the corresponding spool by one groove spacing, with releasing the button causing the leg to engage an adjacent groove. Each sub-mechanism may be arranged such that the translation of each spool causes a differently rotationally oriented notch to be adjacent to the locking plate, with the locking plate only being able to move into an unlocked position, when driven by the actuator, thereby disengaging the latch and unlocking the lock, if all of the notches which are adjacent to the locking plate are in an unlocked rotational orientation.

In such an embodiment, the decoupling mechanism will act to mask which of the notches are in the correct rotational state to unlock.

Each button biasing member will typically comprise a spring, typically a compression spring. This allows the buttons to return to the un-pressed position when the force of the user pressing the button has been removed. There may be a single biasing member for all of the buttons, a common biasing member for a subset of the buttons, or a separate biasing member for each button.

The lock may fall within the definition of the lock described in, and may have any of the optional features of the lock described in our earlier patent application published as WO2017/190891.

In a second aspect of the present invention, there is provided a lockable enclosure designed to contain one or more articles, the lockable enclosure comprising the lock of the first aspect of the present invention, wherein the latch of the lock must be disengaged to gain access to the articles.

The lockable enclosure may comprise a body having an internal cavity sized to contain one or more articles, an opening through the body to permit access to the articles, and a door pivotably connected to the body, wherein when the door is in a closed position it covers the opening in the body. If the latch of the lock is engaged the door may be locked in the closed position. If the latch of the lock is disengaged, then the door may be opened to allow access to the one or more articles.

The lock of the present invention may be disposed in the door of the lockable enclosure. For example, the front section of the lock housing may be integral to the door. In another example, the lock may be inserted in an aperture in the door, such that the front section of the lock housing is accessible by an external user when the door is in a closed position, but the back section of the housing is disposed within the cavity of the lockable enclosure.

Optionally, the door of the lockable enclosure may comprise a plurality of apertures, each aperture configured to receive a button of the lockable enclosure therethrough. The front section of the housing may be connected to the door such that the buttons extend through the apertures in the door.

The door may comprise a plurality of markings indicating the least one number, and/or letter, and/or symbol to which each button corresponds. Optionally, the markings may be engraved, embossed, printed, adhered or otherwise applied to the door of the lockable enclosure. In some embodiments, the markings may comprise a phosphorescent material, such that at least some of the markings may at least partially glow in the dark.

Optionally, the lock actuator may be actuated by a handle or door-knob configured to open the door of the lockable enclosure. For example, when the handle is pressed downwards the actuator may move the locking plate from the first position towards to second position.

Optionally, the lockable enclosure may be a key safe. The lock may be mounted in the door such that the front section of the housing, at least partially, forms a front panel of the door.

In other embodiments, the lockable enclosure may be a safe, or a lockable cabinet or lock box.

The door may be pivotably connected to the body of the lockable enclosure (e.g. key safe) at the base of the door.

Optionally, a rear panel of the body of the lockable enclosure may comprise mounting apertures to enable the body of the panel to be screwed into a wall. Alternatively, the lockable enclosure may be shackled or fastened around an object, for example a door handle. The shackle may only be undone or disconnected from inside the lockable enclosure, i.e. when the latch has been disengaged.

The lockable enclosure may comprise one or more hooks. For example, the lockable enclosure may be a key safe, a rear panel of the body of the key safe may comprise one or more hooks for hanging keys thereon. Optionally, the rear panel of the key safe may comprise one hook for hanging at least one Chubb style key and one hook for hanging at least one Yale style key.

There now follows, by way of example only, description of an embodiment of the invention, described with reference to the accompanying drawings, in which.

Figure 1:
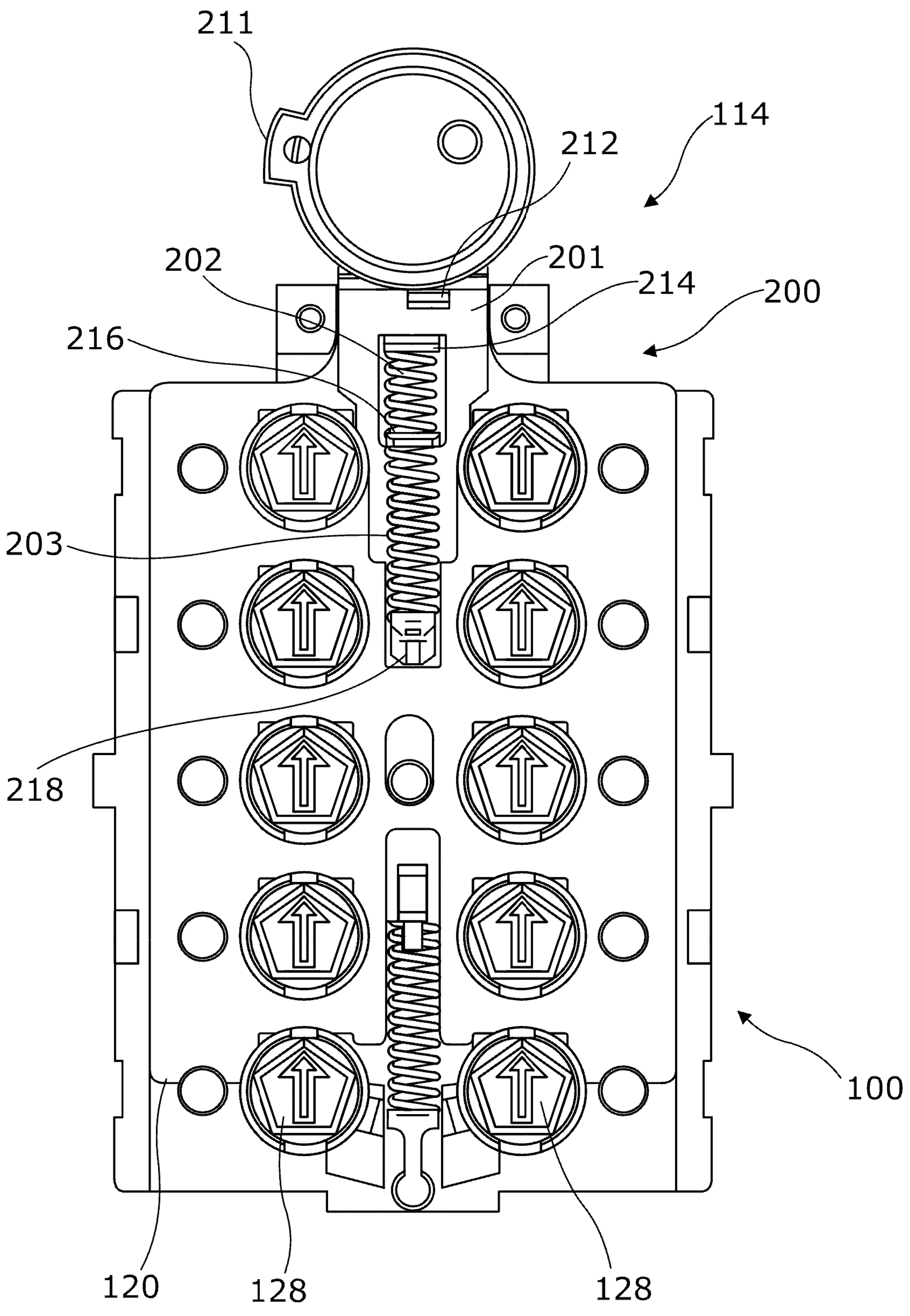
FIG. 1 shows a rear elevation of a lock in accordance with an embodiment of the invention.
Figure 2:
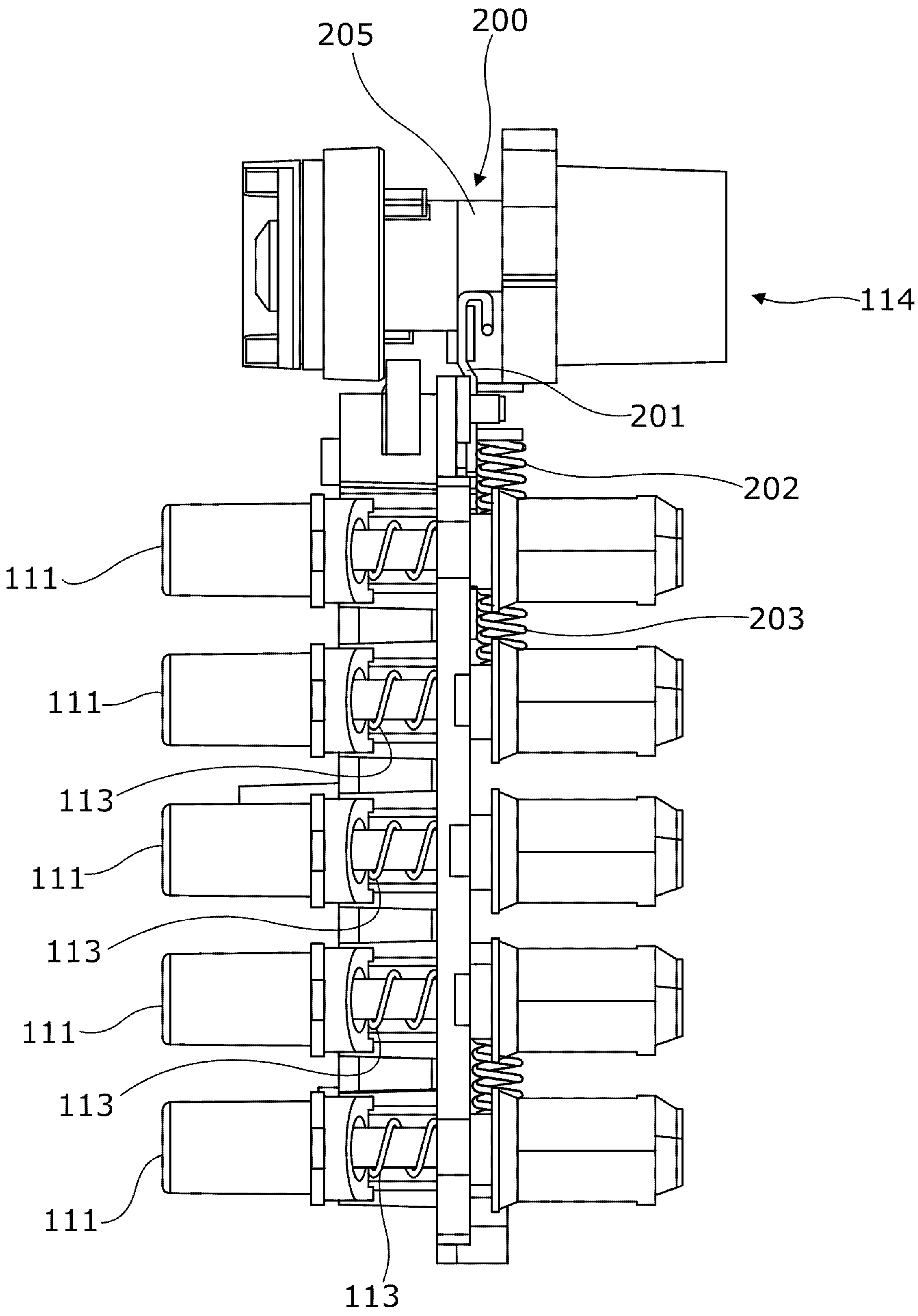
FIG. 2 shows a side elevation of the lock of FIG. 1.
Figure 3:
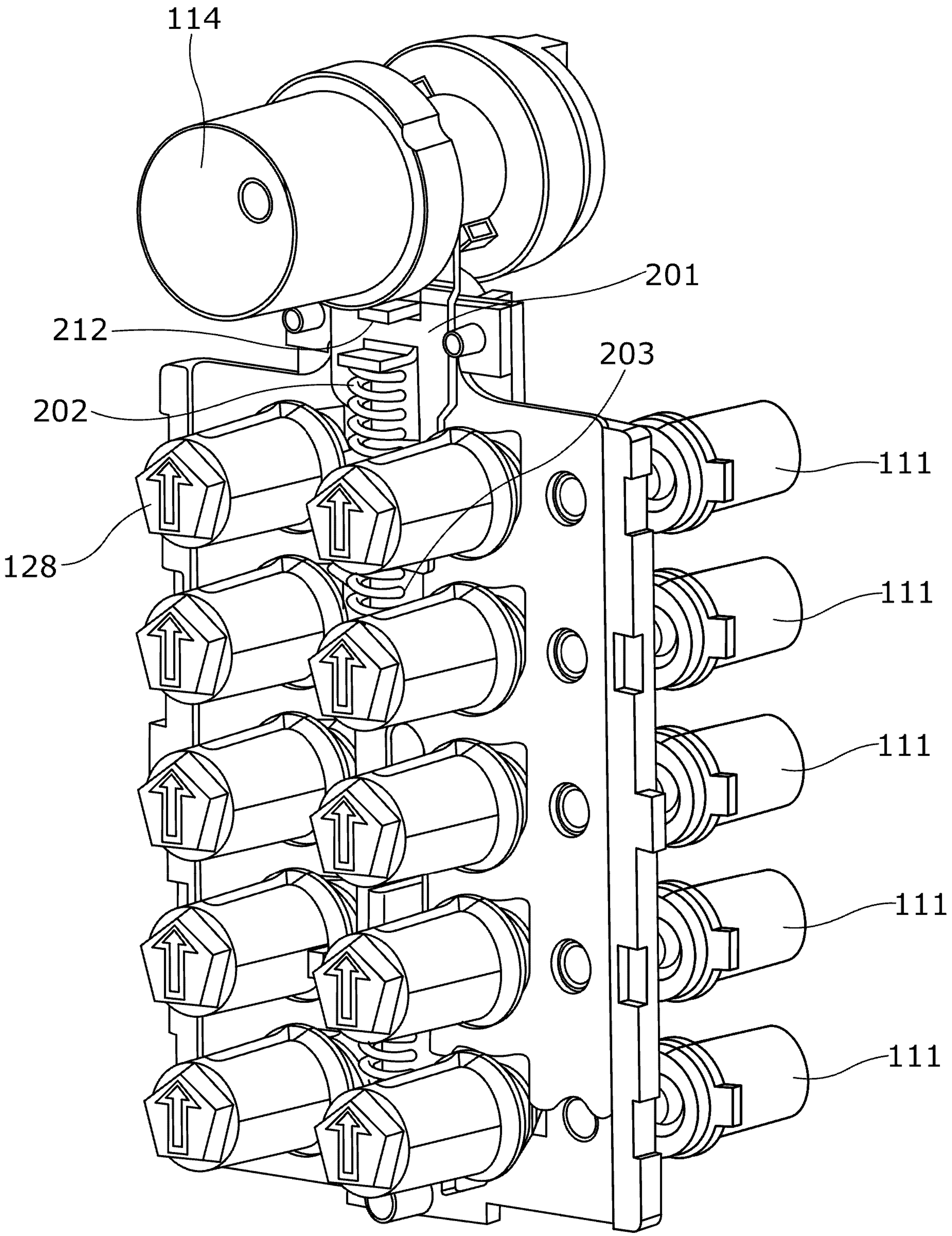
FIG. 3 shows a rear perspective view of the lock of FIG. 1.
Figure 4:
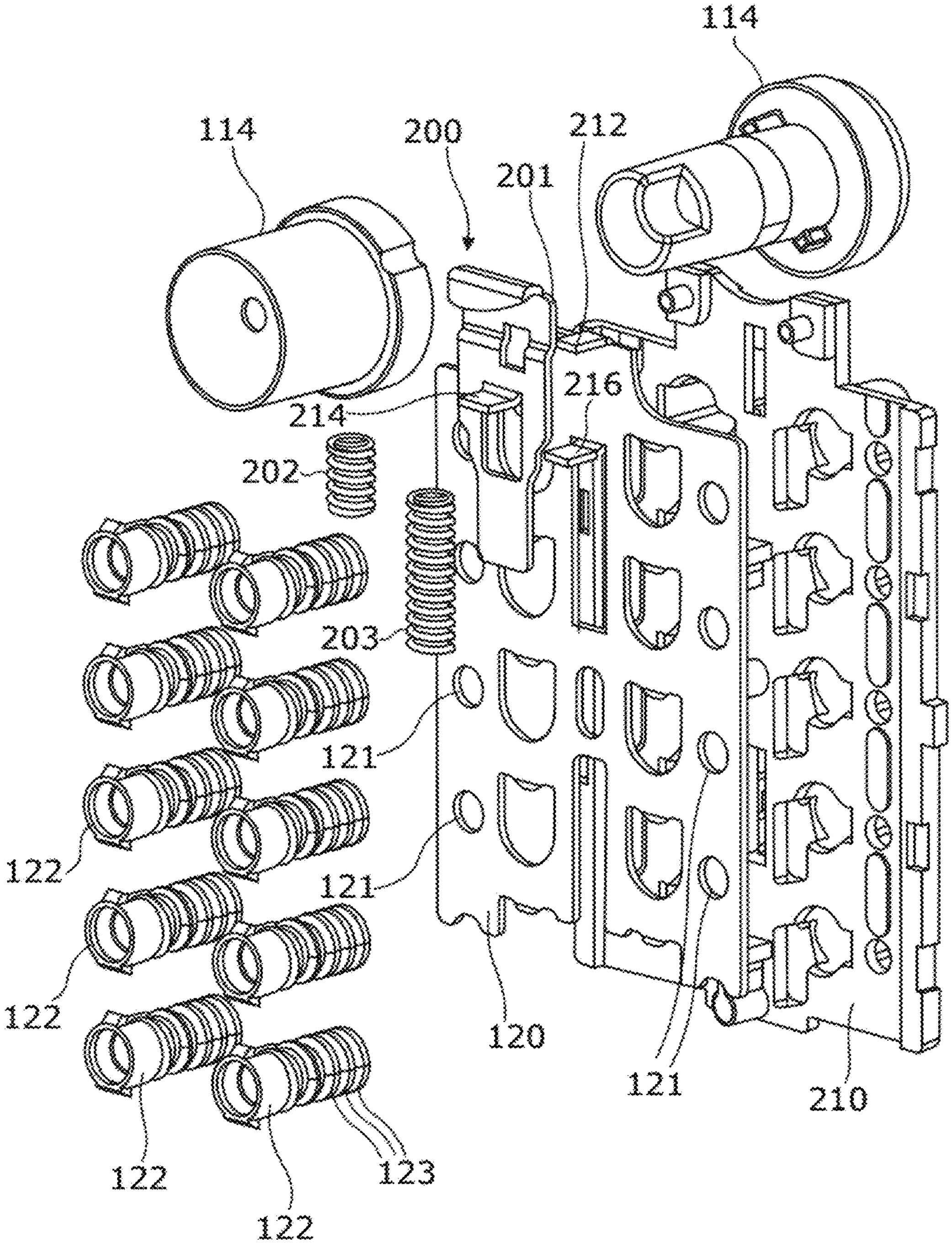
FIG. 4 shows an exploded rear perspective view of the lock of FIG. 1.

FIGS. 1 to 13 of the accompanying drawings show a lock in accordance with an embodiment of the invention. This lock largely functions as described in FIGS. 8*a* to 8*c* and 9 of our previous application published as WO2017/190891 (the teaching of which is incorporated herein) save as described below. Save for in FIG. 9, the lock housing 99 has been removed to show the interior of the lock mechanism. Here, the housing is of a key safe, but this lock could be used in any number of situations.

The lock 100 comprises an actuator 114 having a handle (or elongate member) 115. In this example, when the handle 115 is turned clockwise the actuator 114 disengages latch 117, thereby unlocking the lock 100. When latch 117 is disengaged it is retracted through an opening in a latch plate 118.

To disengage the latch 117 a user must axially press one or more of the buttons 111 a predetermined number of times and turn the handle 115 clockwise. Each of the buttons 111 can be pressed more than once. A biasing member 113 comprising a spring biases each button 111 towards the un-pressed position, therefore when the user removes the pressing force the button 111 returns to the un-pressed position.

A shaft of each of the buttons 111 is configured to be insertable through one of a plurality of holes 121 in a locking plate 120. In other embodiments, only one column of buttons 111 may be provided, or more than two columns of buttons 111 may be provided.

The lock 100 further comprises a plurality of spools 122, one for each button 111. Each spool 122 comprises a plurality of parallel circumferential grooves 123, spaced along an axis parallel to the travel of the buttons 111. Each circumferential groove 123 has a notch extending over a portion of the groove. The notches on a given spool 122 are angularly displaced relative to each of the other notches 124 on that spool.

The lock is also provided with indexing means, which converts each button 111 press into a translation of one groove spacing of the spool 122 associated with that button 111. A retention mechanism retains the position of the spools unless released by a user to cancel a code entry. A user can set the code required for the lock, assuming that the lock has been opened and the user has access to the back of the lock as shown in FIG. 1 of the accompanying drawings, by rotating a setting mechanism 128 for each of the spools, which rotates the spools in their resting position. A number (e.g. 0, 1, 2, 3, 4) marked around the mechanism 128 that the arrow on each mechanism 128 is pointing to determines the number of presses of the corresponding button which is needed to unlock the lock.

The basic principle of the lock is that the lock plate 120 is moved by the actuator 114. of the lock 100. If all of the notches in the grooves are aligned so that the lock plate can move to its furthest travel (because the buttons have all been pressed the correct number of times), then the actuator can continue to move the latch 117. If not, then one of the notches will not be aligned with the lock plate 120 and will stop its travel.

In order to stop any feedback being passed from the lock plate 120 through the actuator to a user of the lock as to which if any of the notches are correctly aligned, we now provide a decoupling mechanism 200. This comprising a driven member 201 which forms a cam follower for an eccentric cam 205 formed as part of the actuator 114. Rotation of the actuator 114 in the clockwise unlocking direction therefore forces the driven member 201 downwards as viewed in the Figures.

The driven member is coupled to the locking plate through a first spring 202, with the locking plate being coupled to a fixed plate 210 (fixed to the housing) by second spring 203. The first spring 202 is mounted between a protrusion 214 on the driven member 201 and a protrusion 216 on the locking plate 120. The second spring 203 is mounted between the protrusion 216 on the locking plate 120 and a protrusion 218 on the fixed plate 210. Both first 202 and second 203 springs are helical springs: the spring constant of the first spring 202 is greater than that of the second spring 203, so that the first spring 202 is stiffer than the second spring 203.

Figure 5:
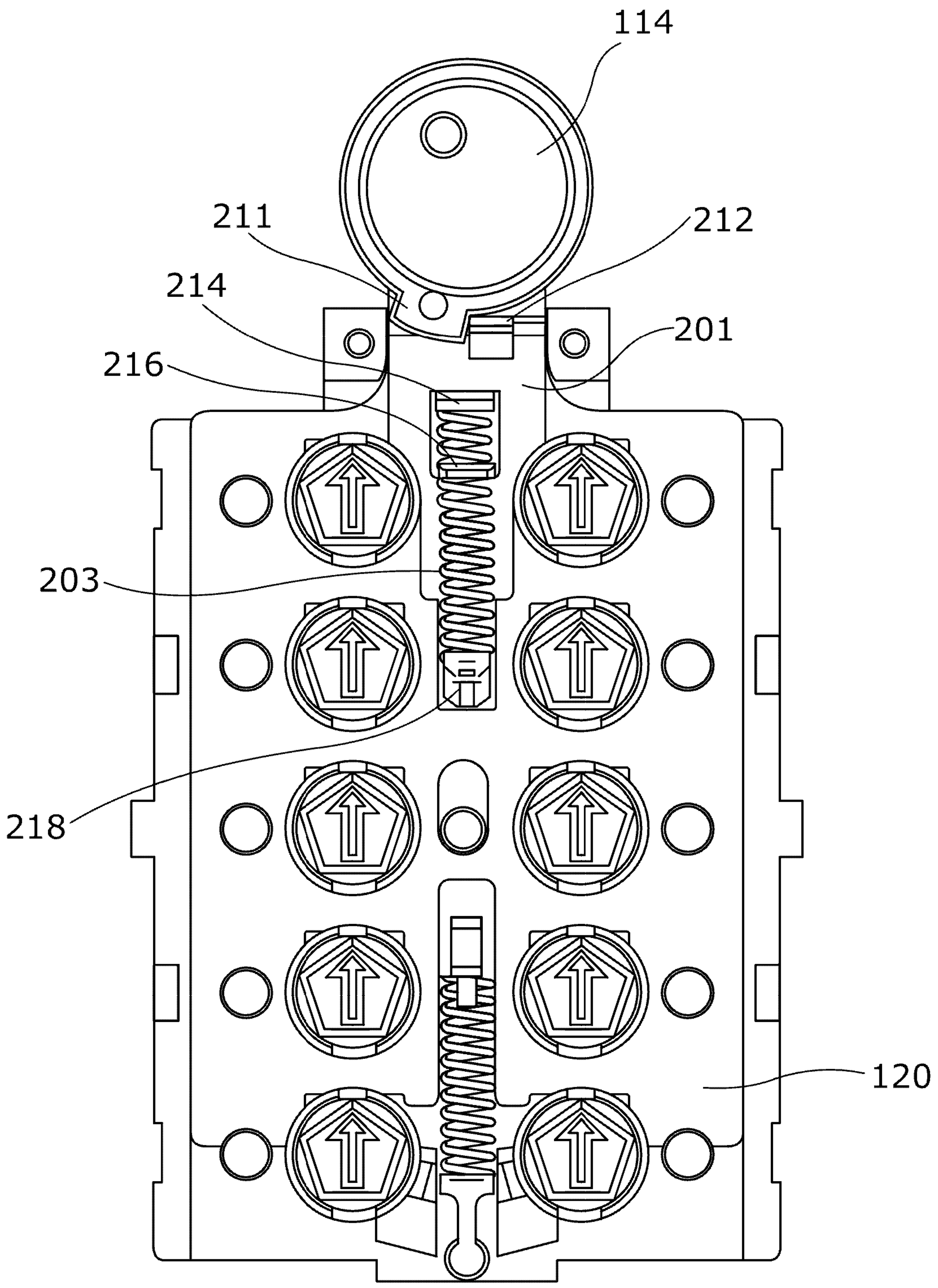
FIG. 5 shows a rear elevation of the lock of FIG. 1, as an unsuccessful attempt to unlock the lock is taking place.
Figure 6:
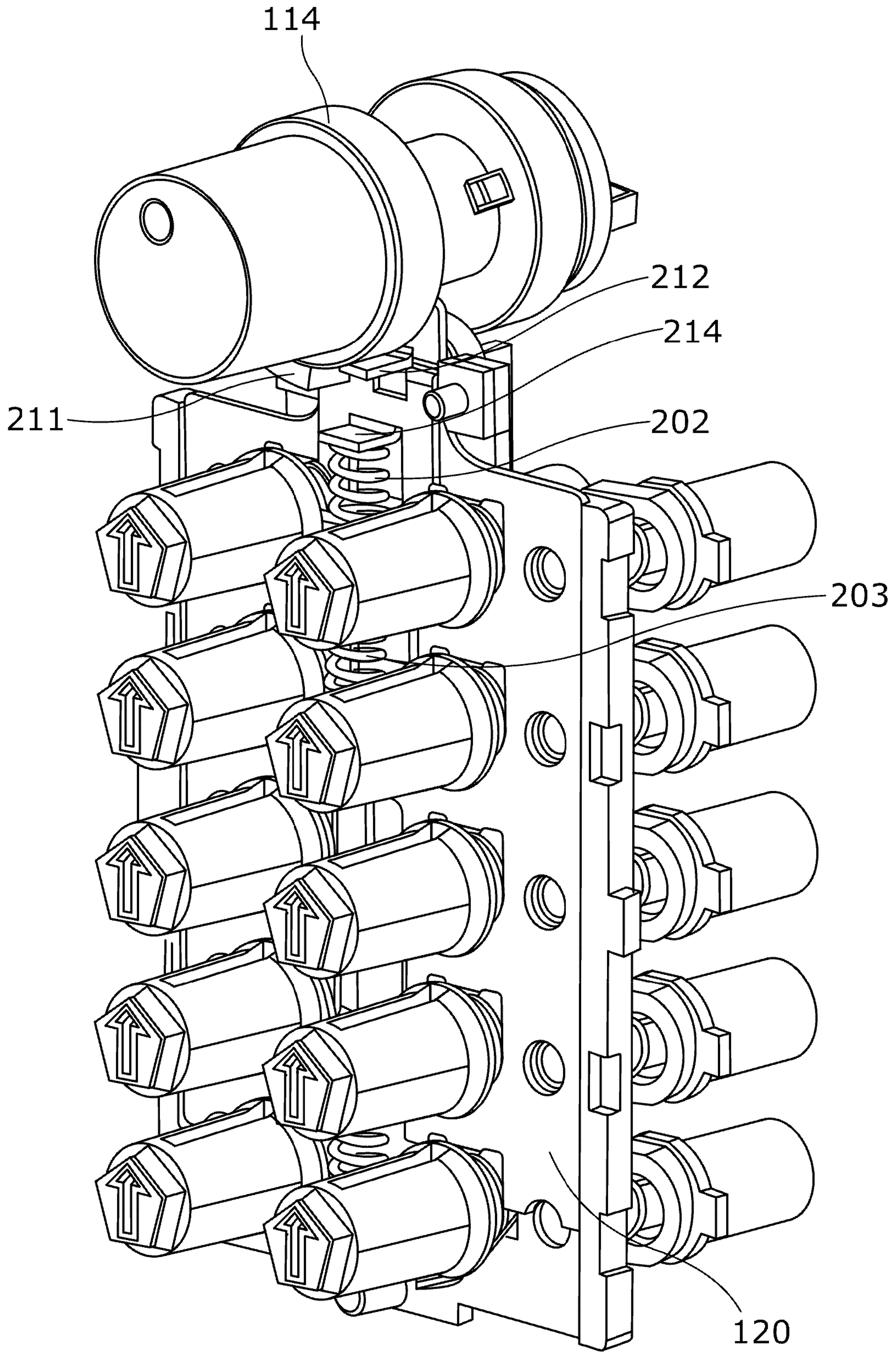
FIG. 6 shows a rear perspective view of the lock of FIG. 1 in the same position as FIG. 5.

Thus, if the actuator 114 is rotated whilst any of the spools are incorrectly orientated (as shown in FIGS. 5 and 6 of the accompanying drawings), the driven member 201 will transmit force to the locking plate 120 through the first spring 202, with the second spring 203 compressing to allow for the initial travel of the locking plate 120. The locking plate will engage one of the unaligned notches, and will cease movement, but further movement of the actuator will cause continued compression of the first spring 202. It is only when a stop 211 on the actuator 114 hits against a protrusion 212 on the locking plate 120 that the travel of the actuator 114 is stopped.

As such, the first 202 and second 203 springs act to decouple the impact of the locking plate 120 on the notches from the actuator, so that a user will receive consistent feedback—the stop 211 hitting the protrusion 212-regardless of what incorrect combination of button presses has been input.

Figure 7:
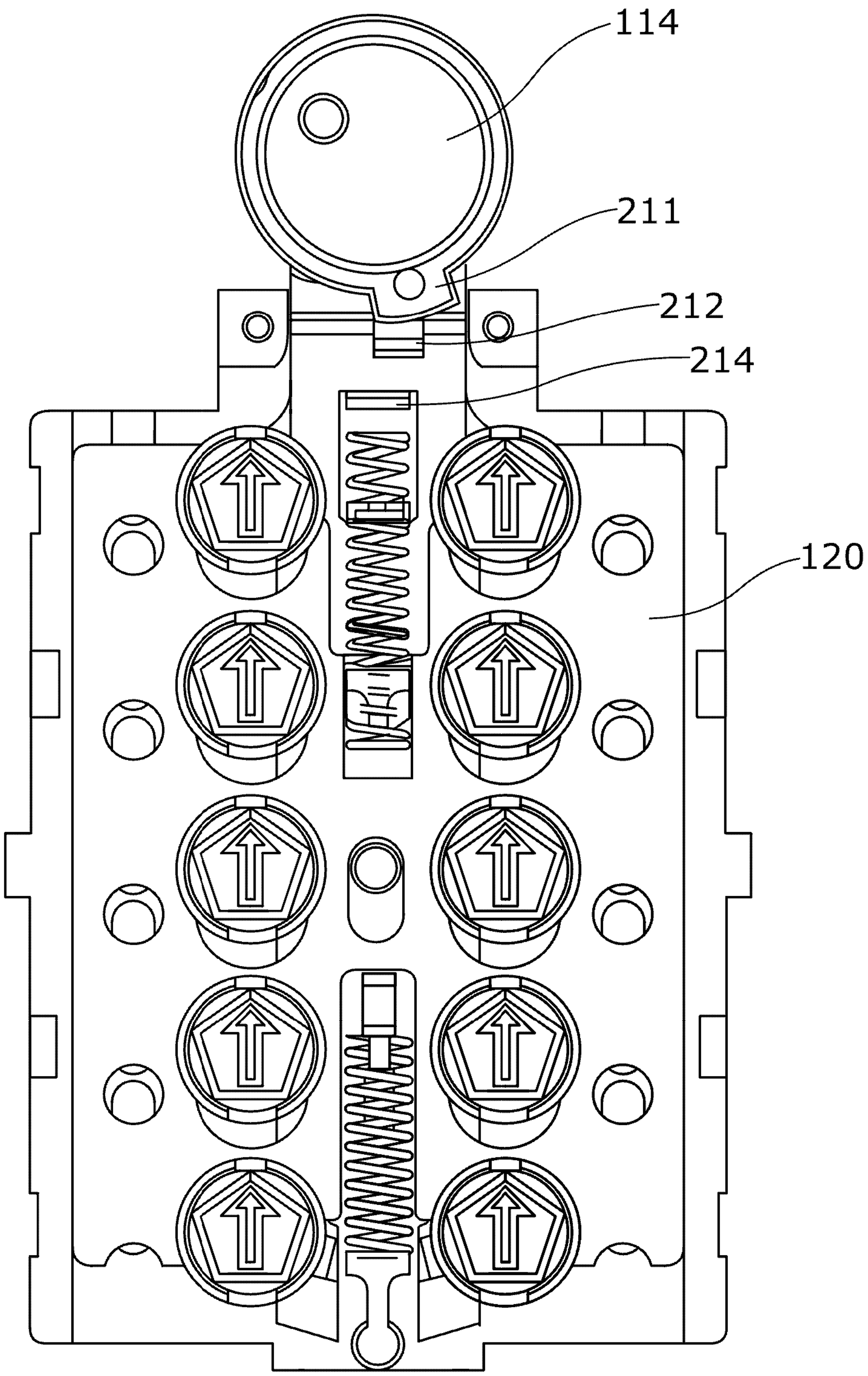
FIG. 7 shows a rear elevation of the lock in FIG. 1, as the lock is successfully unlocked.
Figure 8:
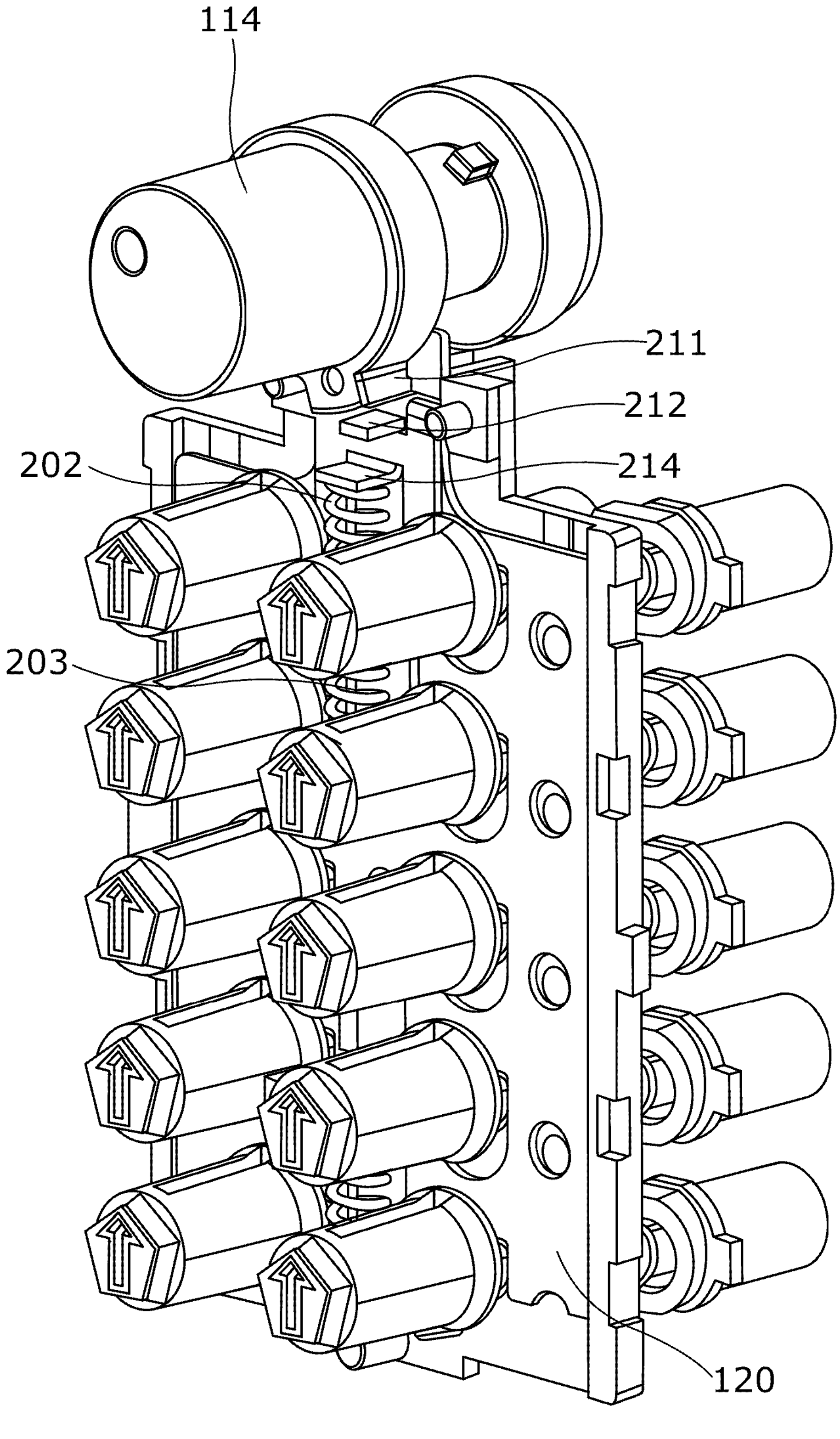
FIG. 8 shows a rear perspective view of the lock of FIG. 1 in the same position as FIG. 7.
Figure 9:
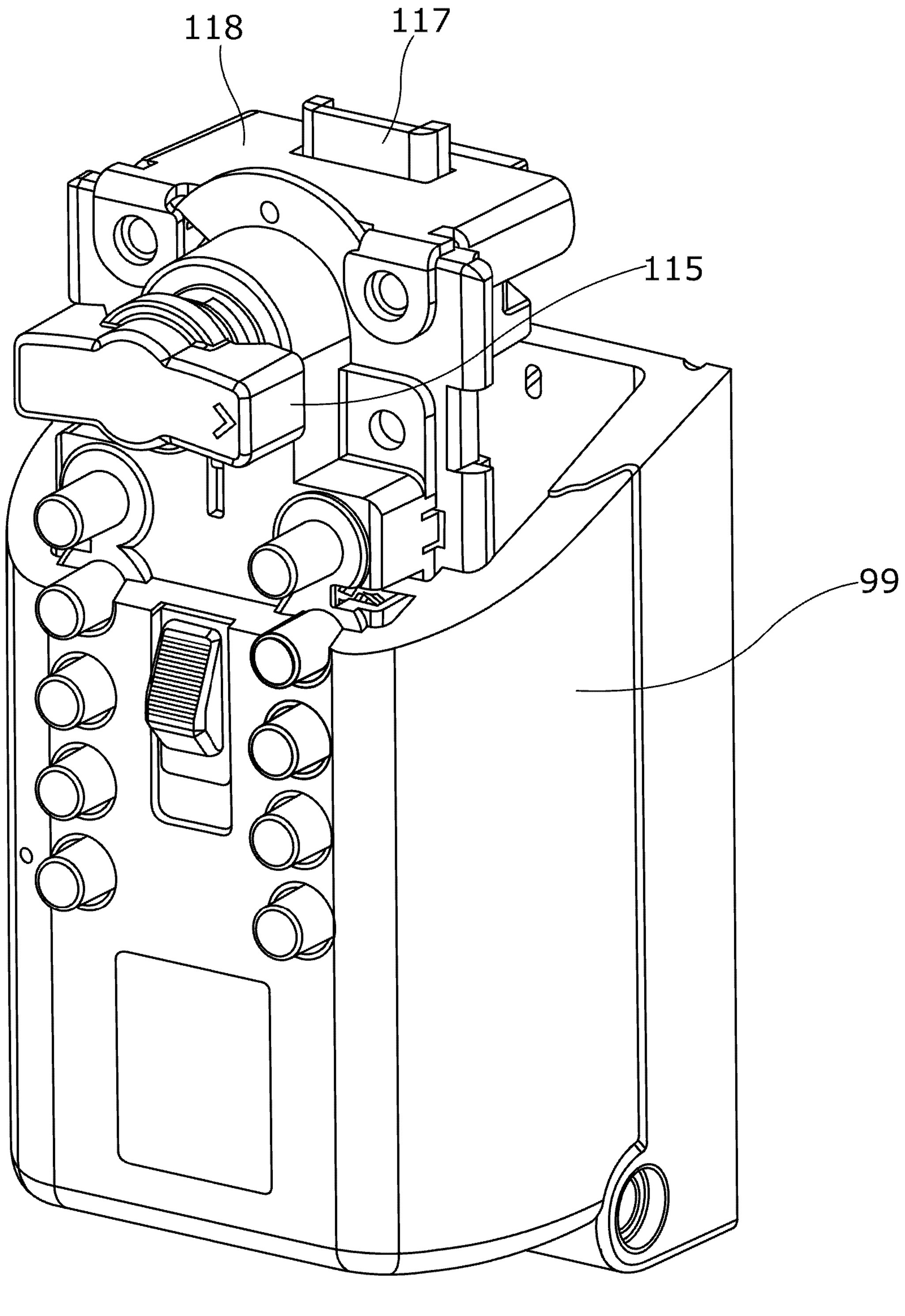
FIG. 9 shows a partially cut away view of a keysafe using the lock of FIG. 1.
Figure 10:
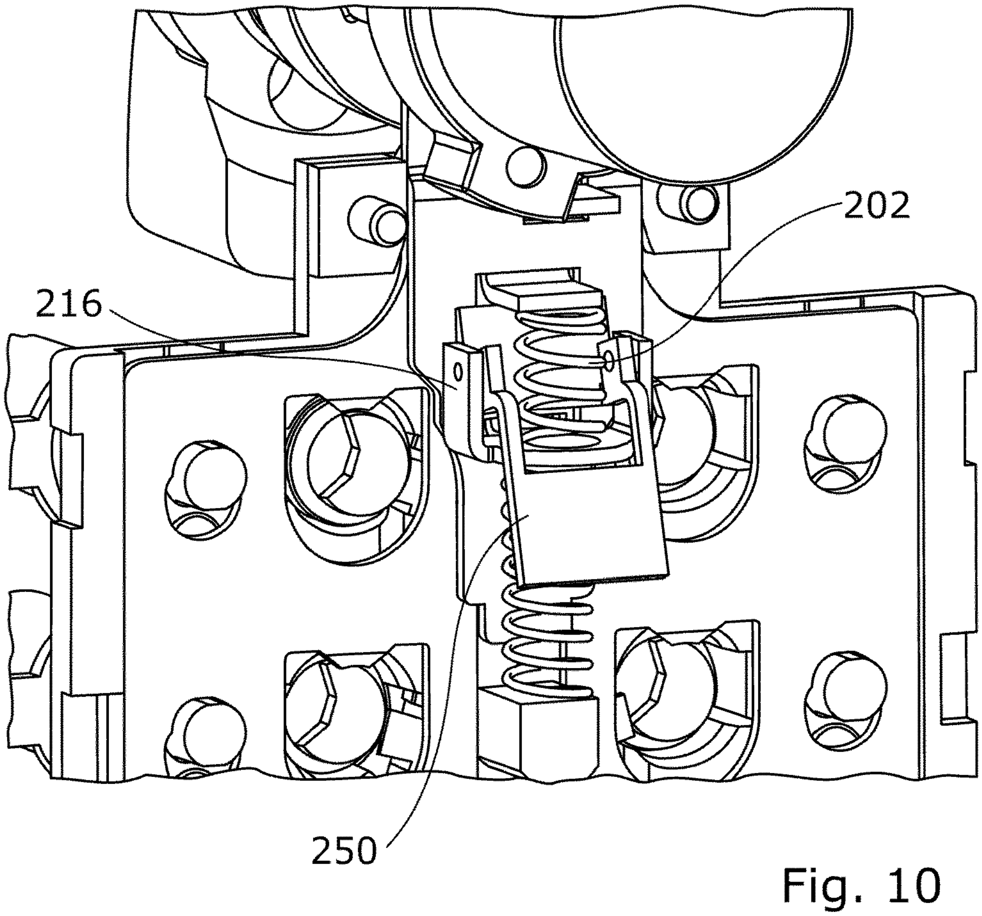
FIG. 10 shows an enlarged perspective view focusing on the toggle of the lock of FIG. 1.

In the case that the correct combination has been entered and the notches are correctly aligned to unlock the lock (as shown in FIGS. 7 and 8 of the accompanying drawings), rotation of the actuator 114 in the unlocking sense will drive the driven member 201 downwards. The driven member 201 will transmit force to the locking plate 120 through the stiffer first spring 202, whilst the weaker second spring 203 compresses. The travel of the locking plate will be to the maximum extent, which allows the locking plate 120 to move to a position where the protrusion 212 no longer prevents the stop 211 from rotating. As such, the actuator 114 can be fully rotated to release the latch.

The secure operation of the lock can be improved by using the toggle shown in more detail in FIGS. 10 to 13 of the accompanying drawings. The toggle 250 is shaped as two parallel flat plates, displaced relatively to one another both perpendicular to their flat surfaces and parallel thereto, with the two plates being joined by connecting arms. The toggle 250 is pivotally mounted on protrusion 216 about a generally horizontal axis parallel to the flat surfaces.

Figure 11:
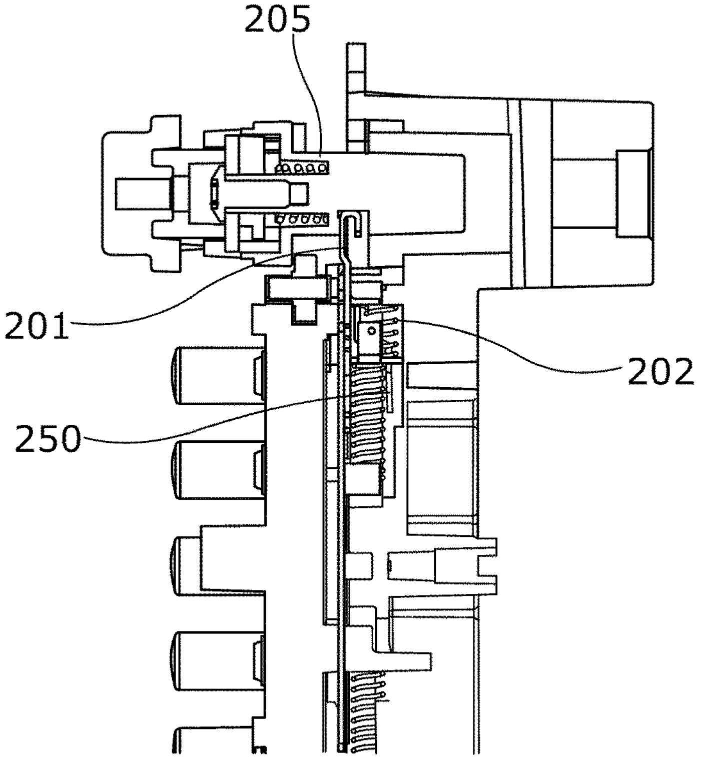
FIGS. 11 to 13 show cross sections through the lock of FIG. 1, showing the operation of the toggle in different states.
Figure 12:
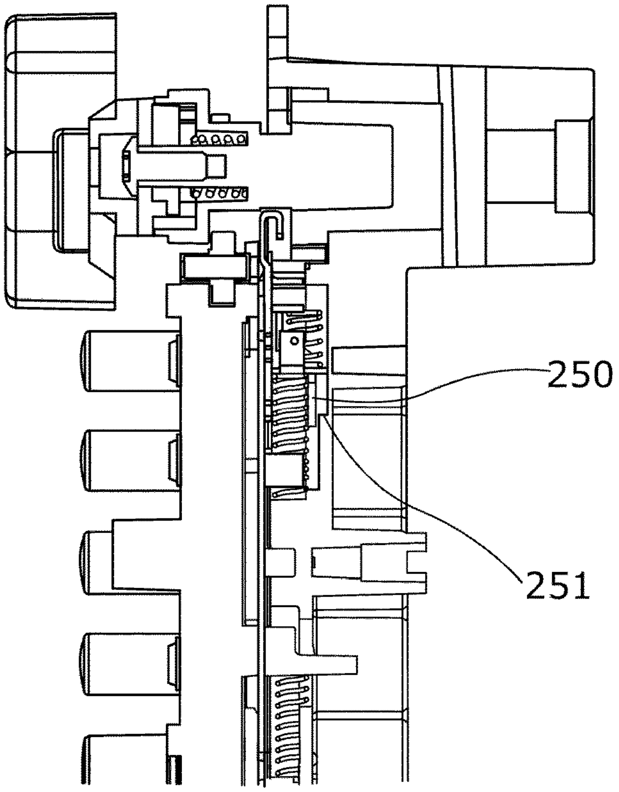
Figure 13:
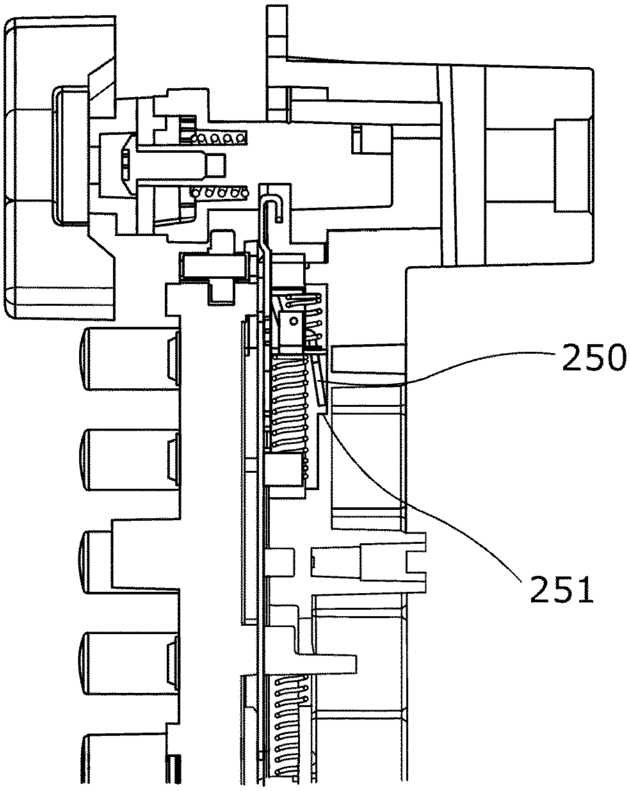

When the driven member 201 is driven by the cam 205, if the locking plate 120 faces an impediment such that the first spring 202 significantly compresses, the motion of the protrusion 216 will cause the toggle 250 to pivot from the starting position shown in FIG. 11 to a protruding position shown in FIG. 13. This will engage a notch 251 in the housing and prevent further movement of the locking plate; this will be consistent regardless of what incorrect combination has been entered.

If the locking plate 120 does not face an impediment, the toggle will remain in the FIG. 11 starting position as the locking plate 120 moves, and the toggle 250 will not engage the notch 251. As such, the locking plate 120 can move to allow the lock to unlock.

The invention claimed is:

1. A lock comprising:

a plurality of buttons, each button having an axis along which each of the buttons may be axially pressed between an un-pressed position and a pressed position, a locking plate, an actuator configured to drive the locking plate;

a locking mechanism having an unlocked state and a plurality of locked states, the plurality of locked states corresponding to different selections of buttons having been pressed into their pressed positions; and a latch;

wherein, when the locking mechanism is in the unlocked state, the locking plate can be driven by the actuator from a locked position into an unlocked position so as to disengage the latch and unlock the lock, wherein, when the locking mechanism is in one of the locked states, the locking mechanism prevents the locking plate from being moved by the actuator;

the lock further comprising a decoupling mechanism by means of which the actuator can drive the locking plate, the decoupling mechanism being arranged to decouple the actuator from the locking plate, so as to reduce any feedback indicative of which of the locked states the locking mechanism is in passing from the locking plate to the actuator;

wherein the decoupling mechanism comprises a driven member driven for motion by the actuator, a first spring connecting the driven member with the locking plate, and a second spring connecting the locking plate to a fixed member fixed relative to a housing of the lock; and wherein the first spring and the second spring each have a spring constant, with the spring constant of the first spring being greater than the spring constant of the second spring.

2. The lock of claim 1, wherein the actuator comprises a rotating member having an eccentric cam which drives the driven member.

3. The lock of claim 2, wherein:

the locking plate comprises a blocking member which;

in the locked position of the locking plate, the blocking member limits rotation of the actuator to a limit; and in the unlocked position of the locking plate, the blocking member allows the actuator to rotate past the limit.

4. The lock of claim 1, wherein:

the locking mechanism comprises a sub-mechanism for each button;

the sub mechanism blocks movement of the locking plate unless the button has been pressed a pre-determined number of times.

5. A lockable enclosure designed to contain one or more articles, the lockable enclosure comprising the lock of claim 1, wherein the latch of the lock must be disengaged to gain access to the one or more articles.

6. The lockable enclosure of claim 5, wherein the lockable enclosure comprises a key safe, a safe, a lockable cabinet, or a lock box.

7. The lock of claim 1, wherein:

the first spring is mounted between the driven member and the locking plate; and the second spring is mounted between the locking plate and a fixed plate fixed to the housing.

8. The lock of claim 7, wherein:

the first spring is mounted between a protrusion on the driven member and a first protrusion on the locking plate; and the second spring is mounted between a second protrusion on the locking plate and a protrusion on the fixed plate.

9. The lock of claim 1, wherein the first spring and the second spring are arranged such that, when the locking mechanism is in one of the locked states and is preventing the locking plate from being moved by the actuator, continued movement of the actuator will cause continued compression of the first spring.

10. The lock of claim 9, wherein:

the actuator comprises a stop;

the locking plate comprises a protrusion;

engagement of the stop and the protrusion limit travel of the actuator to a limited range of travel when the locking mechanism is in one of the locked states; and the compression of the first spring is continued over the limited range.

11. The lock of claim 10, wherein:

when the locking mechanism is in the unlocked state, the stop and the protrusion do not engage due to relative movement of the locking plate and the actuator; and the actuator can move through a wider range of travel than the limited range of travel.

* * * * *